United States Patent [19]

Eremita

[11] Patent Number: 5,074,006
[45] Date of Patent: Dec. 24, 1991

[54] PET VACUUM COMB

[76] Inventor: Nunzio Eremita, 2 Radcliff Rd., Staten Island, N.Y. 10305

[21] Appl. No.: 401,929

[22] Filed: Sep. 1, 1989

[51] Int. Cl.$^5$ .............................................. A47L 5/24
[52] U.S. Cl. ........................................ 15/344; 15/352; 15/402; 15/413
[58] Field of Search ............... 15/344, 347, 352, 402, 15/413; 119/85; 43/139; 132/112, 116

[56] References Cited

U.S. PATENT DOCUMENTS

| 1,525,106 | 2/1925 | Smythe | 15/402 |
| 1,689,580 | 10/1928 | Daddio | 15/344 |
| 1,698,725 | 1/1929 | Kirby | 15/344 |
| 1,871,624 | 8/1932 | Loewinsohn | 15/344 |
| 1,878,858 | 9/1932 | Kitto | 15/344 X |
| 2,507,043 | 5/1950 | Osborn | 15/413 X |
| 3,668,736 | 6/1972 | Loscalzo | 15/402 |
| 4,485,583 | 12/1984 | Planty | 43/139 |
| 4,630,329 | 12/1986 | Shores | 15/402 X |
| 4,799,460 | 1/1989 | Kuhl | 119/85 |
| 4,930,178 | 6/1990 | Monson et al. | 15/344 X |

FOREIGN PATENT DOCUMENTS

| 631615 | 11/1961 | Canada | 15/344 |
| 489066 | 1/1954 | Italy | 15/344 |
| 308457 | 3/1929 | United Kingdom | 15/344 |
| 717578 | 10/1954 | United Kingdom | 15/344 |

Primary Examiner—Henry J. Recla
Assistant Examiner—Robert M. Fetsuga
Attorney, Agent, or Firm—Richard L. Miller

[57] ABSTRACT

This vacuum comb is designed to quickly remove fleas, ticks, other insects, loose hair, and debris from a pet's coat. The device utilizes a housing having spaced apart tines on the front open end for loosening the fleas, ticks, other insects, loose hair and other debris, so as to enable the vacuum produced by the device to pull same into a debris collecting compartment in a removable canister of the device. The housing further includes a motor with a fan blade on its interior for producing the vacuum and an air cooling tube is attached to one end of the motor and extends through the handle grip of the device to a filter, for drawing in atmospheric air to efficiently cool the motor.

6 Claims, 2 Drawing Sheets

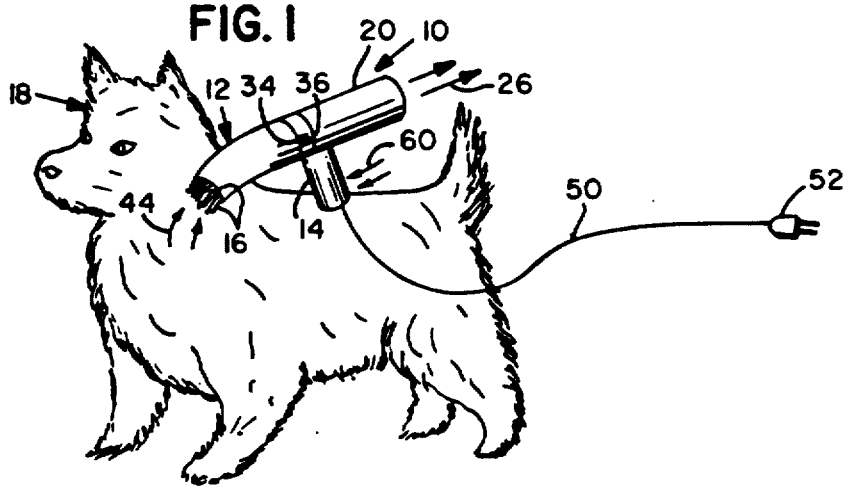
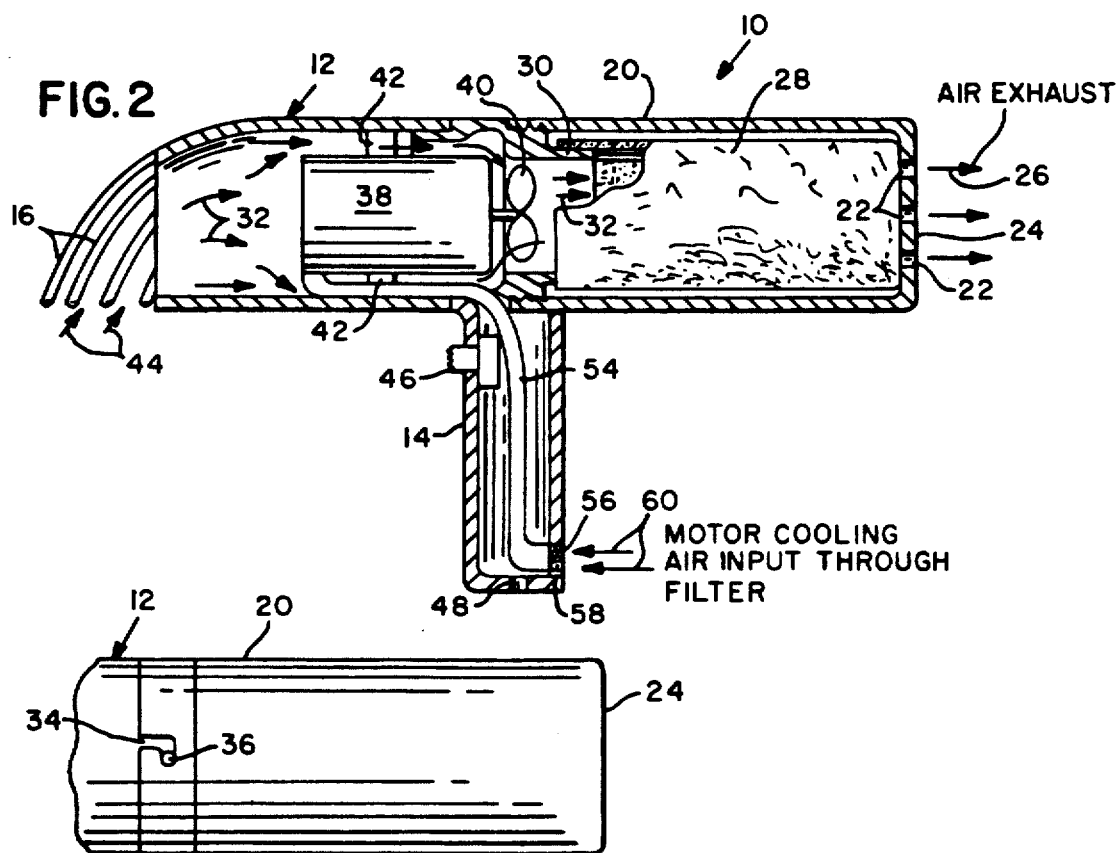
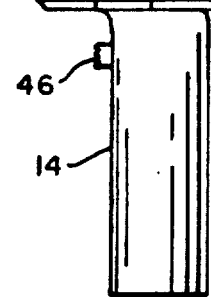

PET VACUUM COMB

BACKGROUND OF THE INVENTION

The instant invention relates generally to grooming animals, and more particularly, to a pet vacuum comb.

Numerous vacuum devices have been provided in the prior art that are adapted to clean a pet's fur or the like. For example, U.S. Pat. Nos. 4,485,583 of Planty, 3,668,736 of Loscalzo, and 4,630,329 of Shores, all are illustrative of such prior art. While these units may be suitable for the particular purpose to which they address, they would not be as suitable for the purpose of the present invention as hereafter described.

SUMMARY OF THE INVENTION

A primary object of the present invention is to provide a pet vacuum comb that will overcome the shortcomings of the prior art devices.

Another object is to provide a pet vacuum comb that will be of such design, as to include a forward comb portion for combing fur or hair, as a vacuum producing unit of the assembly sucks fleas, ticks, lose hair and debris from the animal's coat.

An additional object is to provide a pet vacuum comb that will include an air tube in the handle for cooling the motor of the assembly.

A further object is to provide a pet vacuum comb that is simple and easy to use.

A still further object is to provide a pet vacuum co that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is diagrammatic perspective view of the instant invention illustrated in use on a pet;

FIG. 2 is a cross sectional diagrammatic view of the instant invention with parts broken away;

FIG. 3 is a fragmentary side elevational view thereof;

DETAILED DESCRIPTION OF THE PREFERRED EMBODIMENTS

Figure 5:
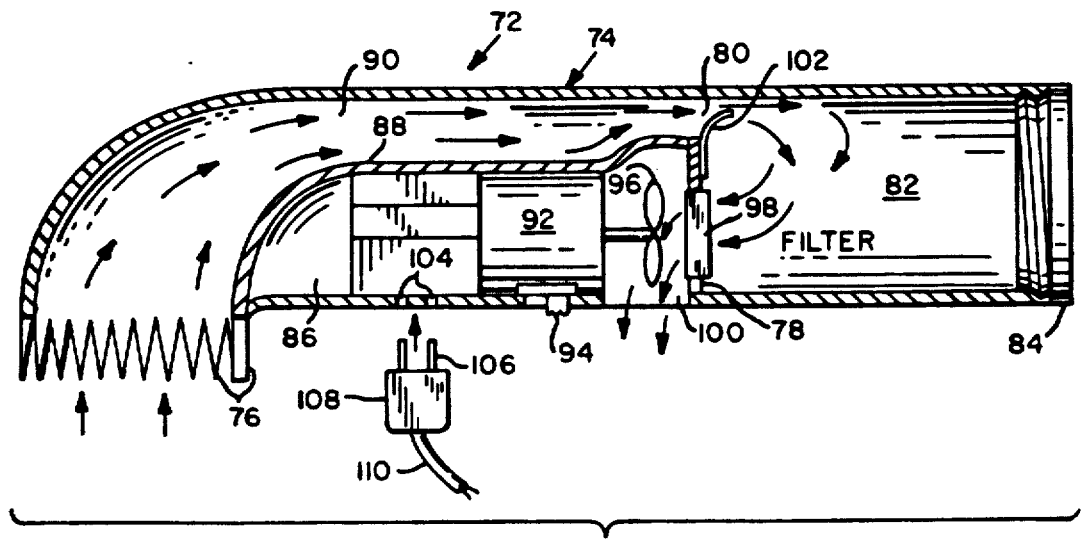
FIG. 5 is a cross sectional diagrammatic view showing another embodiment of the invention.

Turning now descriptively to the drawings, in which like reference characters denote like elements throughout the several views, as best seen in FIG. 1, a vacuum comb 10 is shown to include a housing 12 having a projecting handle grip 14 integrally attached thereto. Spaced apart tines 16 are fixedly secured to a forward open end of housing 12 and serve as a comb to enter the hair of the pet 18 to comb and loosen fleas, ticks, other insects, dirt and debris.

The opposite end of housing 12 is externally threaded and open and receives an internally threaded open end of a screw on canister 20 having a plurality of equally spaced air exhaust openings 22 in its end wall 24, the flow of air exhaust being indicated by the arrows 26. A porous debris collecting bag 28 is received on the interior of canister 20 and this canister's open end is removably received on a neck portion 30 projecting from, and integrally attached to housing 12. Air flow with insects and debris (not shown) is indicated by arrows 32.

Referring now particularly to FIG. 3, the open end of canister 20 is provided with a bayonet-type slot 34 on each side, which removably receives pins 36, that project from and are fixedly secured to the outer periphery of housing 12, and the combination of the slots 34 and the pins 36, enables easy and quick removal of canister 20 with only minimal rotational movement, to remove and replace debris collecting bag 28.

As best seen in FIG. 2, an encased electric motor 38 with fan blade 40 extending from a rear end thereof is mounted on the interior of housing 12, by spaced apart supports 42 that are suitably secured to the inner periphery of housing 12. The casing is closed at a forward end so that the air intake produced by the combination of motor 38 and fan blade 40 is indicated by the arrows 44. In the handle grip 14, an on-off switch 46 is typically connected in series with the motor 38 in a manner well known in the art in order to provide a means for controlling operating power.

An opening 48 through handle grip 14 provides for placement of an electric cord 50 having a male plug for engagement with an electrical outlet for supplying current to the motor 38 of vacuum comb 10. A tube 54 is secured to a forward portion of the casing of motor 38 communicating with the interior of the casing which is open at a rear end for air cooling of motor 38. The other end of tube 54 is secured to an air filter 56 mounted in an opening 58 through a bottom portion of handle grip 14. Air cooling intake air indicated by arrows 60, is drawn into air filter 56, tube 54, and motor 38, by the fan blade 40 when motor 38 is in operation.

In use, plug 52 is first inserted into an electrical receptacle and then while the operator is holding the handle grip 14, the operator directs the tines 16 in the coat of the pet 18 to be vacuumed and places the switch 46 in on position.

After the above, the comb 10 is moved through the coat of the pet 18 and the vacuum produced removes all loose hair, fur particles, fleas, ticks, other insects, and debris that may be lodged on the body of the pet 18. All that is vacuumed flows past the motor 38 and into the debris collecting bag 28 where it remains, and the air that has entered the bag 28 is discharged through the openings 22 in the rear of the canister 20. Simultaneously, cooling air is drawn through the filter 46, the tube 54, and through the motor 38.

Figure 4:
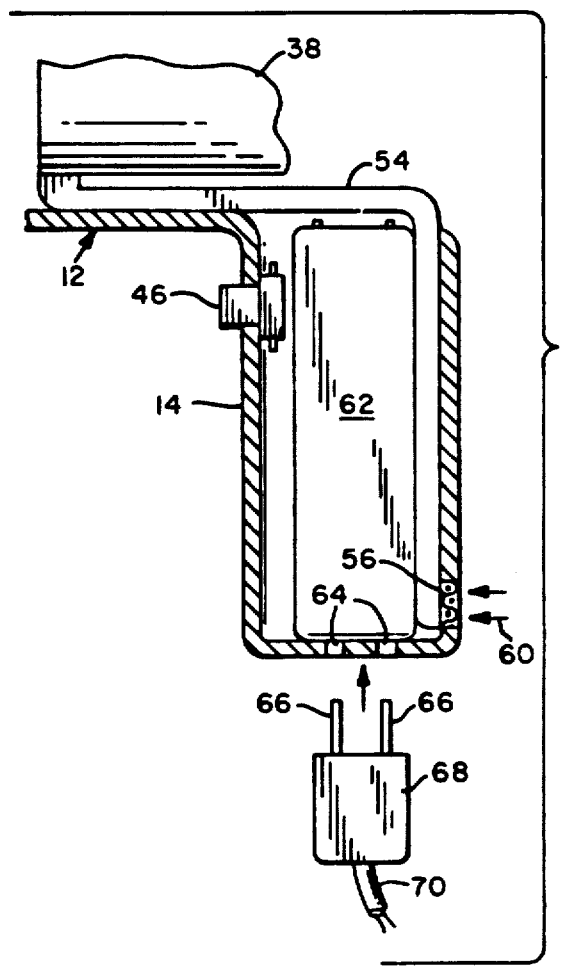
FIG. 4 is a fragmentary side elevational view showing a second embodiment of the invention.

Referring now particularly to FIG. 4 of the drawings, a second embodiment of comb 10 that is wireless, includes a re-chargeable battery unit 62 in the handle grip 14 thereof, for the operation of the motor 38. A pair of spaced apart openings 64 are provided in the bottom of the handle grip 14 for the reception of the prongs 66 of the male plug 68 attached to a cord 70 with another male plug (not shown) that is plugged into an outlet receptacle, the arrangement providing for re-charging battery unit 62. When the prongs 66 are entered into the openings 64 of handle grip 14, they are also entered into similar openings (not shown) in the re-chargeable battery unit. In use, the function of comb 10 is the same as heretofore described, with the exception, that it is powered by the re-chargeable battery unit 62.

Referring now to FIG. 5 of the drawings, a third embodiment 72 is shown to include a hand held housing 74 having a plurality of close and equally spaced apart teeth 76 for grooming pet 18. A divider wall 78 is fixedly secured to the inner periphery of housing 74 near its rear and open end and a space 80 is provided above divider wall 78 for providing incoming air passage into rear first compartment 82 for the deposit of vacuumed debris.

A closure screw cap 84 is threaded into the open end of the compartment 82, and a forwardly disposed second compartment 86 is defined in housing 74 by an inner wall 88, and inner wall 88 also defines a passageway 90 leading from the teeth 76 towards the rear first compartment 82. One end of inner wall 88 is also fixedly secured to a top portion of divider wall 78 and fixedly secured to the inner periphery of housing 74.

A combination motor and re-chargeable battery unit 92 is secured within second compartment 86 and is operated by on-off switch 94 protruding from housing 74 to control rotation of fan blade, 96 that pulls air through filter 98 and discharges the air from an opening 100 through housing 74.

A flexible check flat valve 102 is fixedly secured to one side of divider wall 78, and serves to cover and uncover passageway 90, automatically, when embodiment 72 is in operation. A pair of openings 104 are provided through housing 74 and align with similar openings (not shown), through combination motor and re-chargeable battery unit 92. Openings 104 receive the pair of prongs 106 of male plug 108 of cord 110, and cord 110 is similar to the cord 70 above described and illustrated in FIG. 4, for re-charging purposes In use, third embodiment 72 functions in a similar manner to that described in the embodiment of FIG. 1, with the exception that when fan blade 96 is rotating, it pulls the insects, loose hair and debris up through passageway 90. When the above is occurring, the force of the incoming air pushes the flexible check flap valve 102 rearwardly, thus depositing all of the foreign matter into the compartment 82. This incoming air flow into compartment 82 exhausts through the filter 98 into opening 100 of housing 74 and finally, into the exterior atmosphere leaving the foreign matter in the compartment 82.

When embodiment 72 is turned off, the check flap valve 102 returns to its closed position, so as to prevent the deposited foreign matter from being released into the passageway 90 and out of this embodiment 72. Discarding of the deposited material from compartment 82 is effected by unscrewing the screw cap 84 and discharging debris collected there in into a waste receptacle. The screw cap 84 is then screwed back into the compartment 82 in order to restore the device to a functional state.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A pet vacuum comb which comprises:
 a) a housing having a front, open end with comb means having spaced apart tines attached thereto for loosening fleas, ticks, other insects, loose hair, and debris from a pet's coat;
 b) a canister having an open front end removably received on an open rear end of said housing, said canister having means for allowing air flow therethrough;
 c) a porous bag contained in said canister;
 d) a hollow handle grip secured to said housing, for holding said housing;
 e) a vacuum producing motor secured in said housing and having a casing closed at a front end and opened at a rear end and a vacuum producing fan means extending from the rear end of the motor;
 f) an air cooling tube received in said handle grip;
 g) an air filter operatively connected to the cooling tube, the cooling tube having a first end secured to said casing at a front end and in communication with the interior thereof and a second end secured to said air filter, the vacuum produced by the motor fan means drawing cooling air through the tube and air filter into the casing across the motor.

2. A pet vacuum comb as recited in claim 1, wherein said plurality of spaced apart tines are integrally attached to the front open end of said housing.

3. A pet vacuum comb as recited in claim 2, wherein supports are fixedly secured to an inner periphery of said housing and support said motor and an extending neck portion is integrally attached to said rear open end of said housing and, is externally threaded and receives internal threads of said open end of said canister, and said neck portion is removably received in an open end of said porous bag, and said air flow means includes a plurality of spaced apart openings are provided through an end wall of said canister whereby exhaust air passes through said porous bag and out through the openings provided through said end wall.

4. A pet vacuum comb as recited in claim 3, wherein the air filter is secured in an opening provided through said handle grip.

5. A pet vacuum comb as recited in claim 2, wherein said canister includes a pair of oppositely opposed pins projecting from and fixedly secured to an outer periphery of said canister, and said pins are removably received in bayonet-type openings provided through an end portion of said canister, the combination of the pins and the bayonet-type openings providing for securing said canister to said housing by rotation of said canister.

6. A pet vacuum comb as recited in claim 1, wherein said handle grip comprises a rechargeable battery unit therein for eliminating an external power source, and a core with a first plug on a first end is electrically connectable to said rechargeable battery unit for recharging, and a second plug on a second end of said cord is connectable to an electrical outlet receptacle.

* * * * *